United States Patent [19]

Langenstein

[11] 4,007,526
[45] Feb. 15, 1977

[54] LAWN-EDGE TRIMMER WITH DETACHABLE HANDLE

[75] Inventor: Max Langenstein, Illertissen, Germany

[73] Assignee: Max Langenstein Feld- und Gartengerate, Illertissen, Germany

[22] Filed: May 7, 1976

[21] Appl. No.: 684,013

[30] Foreign Application Priority Data

May 10, 1975 Germany ............................ 2520873

[52] U.S. Cl. .................................. 30/276; 56/17.5
[51] Int. Cl.² ........................................ B26B 25/00
[58] Field of Search ............... 30/DIG. 1, 500, 220, 30/228, 276; 56/17.5, 17.6

[56] References Cited

UNITED STATES PATENTS

| | | | |
|---|---|---|---|
| 2,629,220 | 2/1953 | Grieder | 30/228 X |
| 3,693,255 | 9/1972 | Langenstein | 30/276 |
| 3,759,020 | 9/1973 | Simmons | 30/276 X |
| 3,805,385 | 4/1974 | Ritums | 30/220 |
| 3,952,239 | 4/1976 | Owings | 30/DIG. 1 |

*Primary Examiner*—Al Lawrence Smith
*Assistant Examiner*—J. C. Peters
*Attorney, Agent, or Firm*—Karl F. Ross; Herbert Dubno

[57] ABSTRACT

A lawn-edge trimmer with a grip at the top of a motor housing, a shield plate at the bottom of that housing overlying a rotor, and a detachable mounting forming a socket for a long-stemmed handle has a motor-control switch with a spring-loaded trigger on the underside of the grip in a cutout of the web-shaped mounting. The tubular handle stem is axially traversed by a thrust rod which, on being displaced by a knob near the handle, acts through a camming mechanism on the mounting to depress the trigger when the mounting and the handle are emplaced on the housing.

10 Claims, 5 Drawing Figures

LAWN-EDGE TRIMMER WITH DETACHABLE HANDLE

FIELD OF THE INVENTION

My present invention relates to a lawn-edge trimmer of the type described in my prior U.S. Pat. No. 3,693,255 dated Sept. 26, 1972.

BACKGROUND OF THE INVENTION

The lawn trimmer described in my prior patent comprises a motor housing which is rigid at the top with a laterally extending grip and at the bottom with a generally horizontal shield plate overlying a rotary cutter driven by a motor in the housing. The user may hold the apparatus by the grip, bending close to the ground in that instance, but may also employ a long-stemmed handle allowing the operation of the trimmer in an erect position. The handle is received in a socket forming part of a mounting member which is detachably secured to the housing between the grip and the shield plate. The patent, in fact, shows two such sockets with different angles of inclination, the handle being insertable into either socket for the convenience of persons of different height.

In order to start and stop the motor, the grip of the trimmer disclosed in my prior patent is provided on its underside with a manually operable switch which opens and closes upon alternate depressions of its trigger. This indexing of the switch in either an open or a closed position is necessary since the user, when employing the long handle, cannot keep the trigger continually depressed in order to maintain the motor in operation. It could, however, lead to an accident if the user, holding the apparatus by its grip, happens to drop it with the switch closed. It is, of course, possible to provide both the handle and the grip with individual spring-biased switches connected in parallel so that depression of either trigger closes the motor circuit; in that case, however, special connectors must be provided for completing the circuit to the second switch when the handle is being emplaced.

OBJECT OF THE INVENTION

The object of my present invention, therefore, is to provide means in such a lawn trimmer for automatically coupling an actuator on the handle with the existing switch on the grip when the handle and its mounting member are secured to the motor housing.

SUMMARY OF THE INVENTION

In accordance with my present invention, the handle has a tubular stem accommodating a movable force-transmitting element which forms part of a linkage between the switch trigger on the grip and an ancillary actuator therefor on the handle.

More particularly, the linkage may comprise a cam on the mounting member positively connected with the force-transmitting element — which is preferably a thrust rod — and a cam follower on the mounting member displaceable by the cam to depress the trigger.

BRIEF DESCRIPTION OF THE DRAWING

The above and other features of my invention will now be described in detail with reference to the accompanying drawing in which.

SPECIFIC DESCRIPTION

Figure 1:
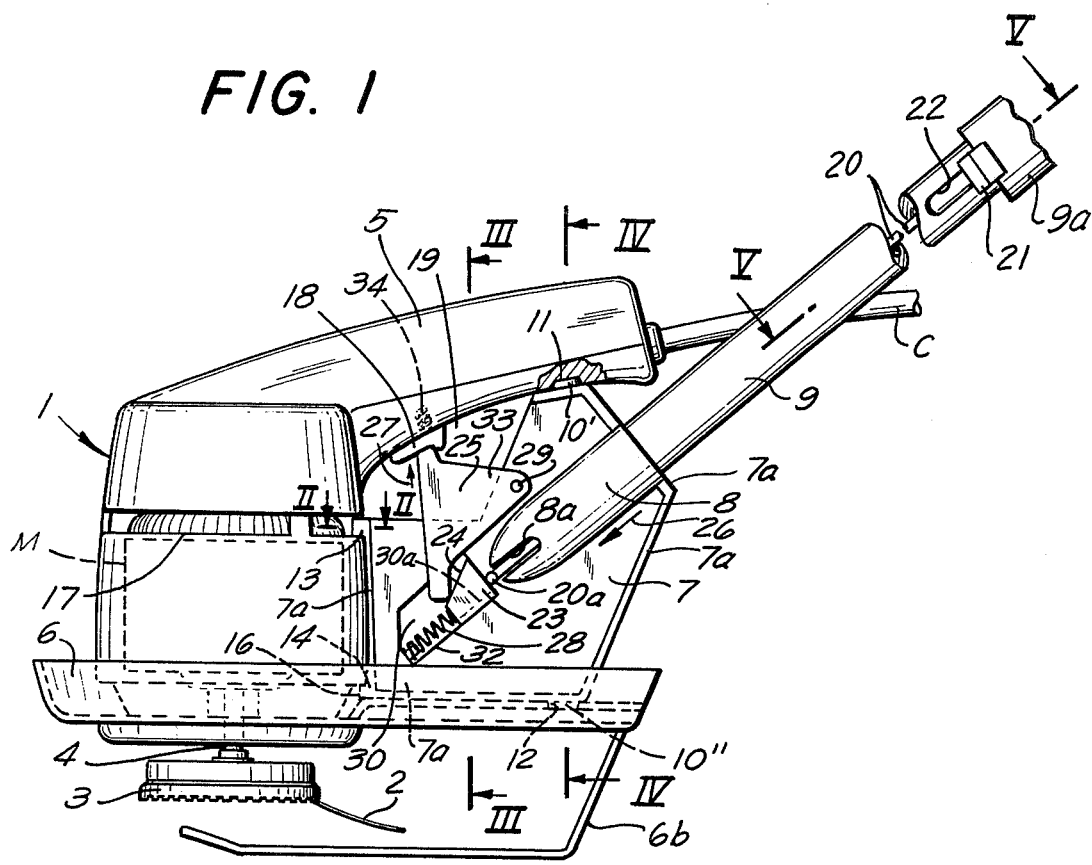
FIG. 1 is a side view, partly broken away, of a trimmer embodying my present invention.
Figure 2:
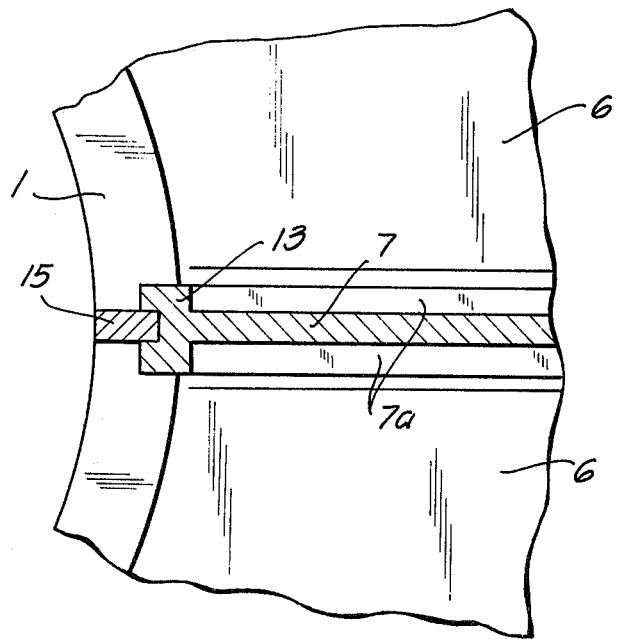
FIGS. 2, 3, 4 and 5 are cross-sectional views respectively taken on the lines II—II, III—III, IV—IV and V—V of FIG. 1.
Figure 3:
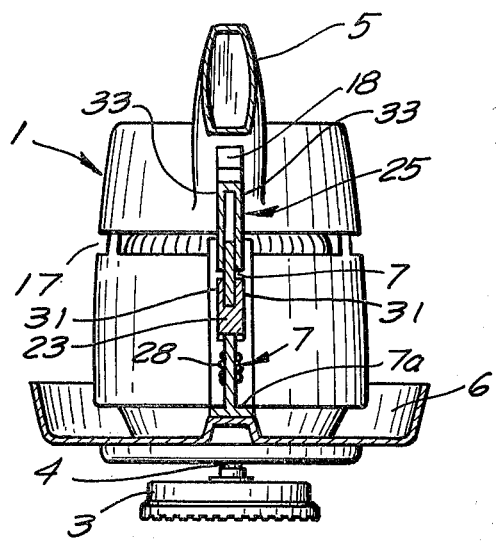
Figure 4:
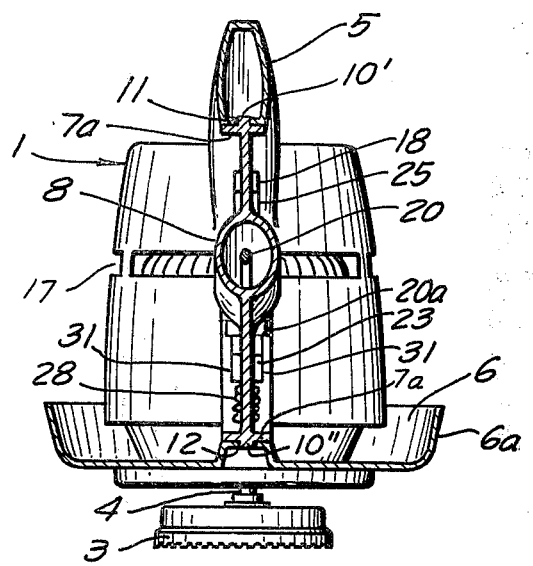
Figure 5:
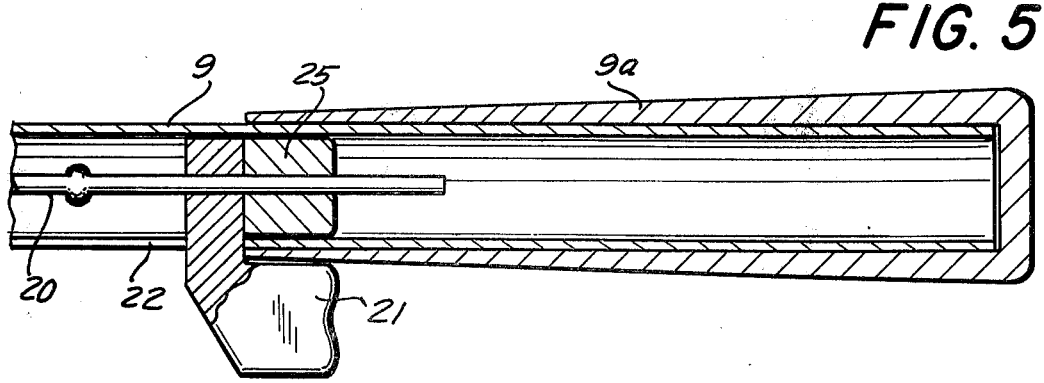

In the drawing, as far as practical, I have employed the same references as in my prior U.S. Pat. No. 3,693,255 to designate corresponding parts. Thus, the trimmer shown in FIGS. 1-5 comprises a housing 1 for a motor M with a vertical axis having a shaft 4 which carries a hub 3 supporting a cutting element 2 in the form of a wire of synthetic resin. The cutter assembly 2–4 is overlain by a shield plate 6 rigid with the lower end of motor housing 1, the plate 6 being tray-shaped and provided with an upstanding rim 6a. The housing 1 can be supported above the ground by skids 6b secured to plate 6.

A mounting member 7 for a handle 9a, attached to the top of a tubular stem 9, is detachably secured to a lateral grip 5, rigid with the top of housing 1, and to the shield plate 6. Member 7, which is a vertical web in an axial plane of stem 9, is reinforced by a peripheral flange 7a carrying an upper lug 10' and a lower lug 10'' snap-fitted into respective holes 11 and 12 of grip 5 and plate 6. Web 7 has a cutout 19 accommodating a trigger 18 for a switch, not further illustrated, lying in the energizing circuit of motor M to which power is supplied via a cable C. Trigger 18, unlike its counterpart in my prior patent, is biased by a spring 34 so as to close the motor circuit only when being pressed upwardly against the spring force. Stem 9 is received in an inclined socket 8 integral with member 7. Two bifurcate claws 13 and 14 on that member embrace respective fins 15 and 16 rigid with housing 1, fin 15 being located in an air-intake slot 17 for the motor M.

In accordance with my present invention, a thrust rod 20 extends axially within stem 9 where it is guided by a bearing 35 and from which it projects downwardly through the lower end of socket 8, terminating in a cross-bar 20a. The bar 20a bears down upon a cam 23 slidably received in an aperture 30 of web 7, the cam 23 having a pair of wings 31 bracketing a sloping upper edge of aperture 30. An inclined lower edge 32 of this aperture forms a guide path for the cam 23 which can thus shift, against the force of a compression spring 32 also lodged in aperture 30, in the axial direction of stem 9 when the rod 20 is displaced downwardly by means of an actuating knob 21 located just below handle 9a; knob 21 has an extension passing through a longitudinal slot 22 of stem 9 and embracing the rod 20. Upon such downward sliding of cam 23, as indicated by an arrow 26 in FIG. 1, a ramp 24 thereof acts upon a lower extremity of a thrust member 25 designed as a lever which is fulcrumed on web 7 by a pivot pin 29 passing through a bifurcate extension 33 of that lever and straddling an edge of cutout 19. An upper extremity of lever 25 contacts the trigger 18 so as to press it upwardly against the force of its restoring spring 34, as indicated by an arrow 27, when the lever is displaced by the cam 23 upon a downward shifting of knob 21; cross-bar 20a slides in an extension 30a of aperture 30 parallel to edge 32 and aligned with a pair of side slots 8a of socket 8. Fulcrum 29 is laterally offset from the two extremities of lever 25 coacting with cam 23 and with trigger 18.

It will thus be seen that the emplacement of supporting web 7 with socket 8 properly positions the cam follower 25 in engagement with trigger 18 so that the switch controlled by the trigger can be closed with the aid of knob 21 as soon as the stem 9 with its handle 9a and thrust rod 20 is inserted into the socket 8. The two springs 28 and 34 prevent any accidental closure of the switch during that insertion.

I claim:

1. A lawn-edge trimmer comprising:
    a housing rigid with a laterally extending grip at the top thereof and with a generally horizontal shield plate at the bottom thereof;
    a motor in said housing provided with a switch including a spring-biased trigger on said grip depressible to energize said motor;
    a rotatable cutter underneath said shield plate driven by said motor;
    a mounting member detachably secured to said housing between said grip and said shield plate;
    a tubular stem extending inclinedly upwardly from said mounting member and terminating in a handle above the level of said grip;
    an ancillary actuator for said switch on said stem adjacent said handle; and
    link means operatively connecting said actuator with said trigger, said link means including a force-transmitting element movably held in said stem.

2. A lawn-edge trimmer as defined in claim 1 wherein said link means further comprises a cam on said mounting member positively connected with said element and a cam follower on said mounting member displaceable by said cam to depress said trigger.

3. A lawn-edge trimmer as defined in claim 2 wherein said element is a push rod bearing down upon said cam, further comprising a biasing spring on said mounting member bearing upon said cam to resist displacement thereof by said push rod.

4. A lawn-edge trimmer as defined in claim 3 wherein said cam is slidably guided on said mounting member for movement substantially in line with said stem.

5. A lawn-edge trimmer as defined in claim 3 wherein said cam follower is a lever fulcrumed on said mounting member and provided with a pair of extremities respectively contacting said cam and said trigger.

6. A lawn-edge trimmer as defined in claim 5 wherein the fulcrum of said lever is laterally offset from a line interconnecting said extremities.

7. A lawn-edge trimmer as defined in claim 6 wherein said mounting member comprises a substantially vertical web in a plane including the axis of said stem, said lever being disposed in a cutout of said web and being provided with a bifurcation straddling an edge of said cutout, said fulcrum being located on said bifurcation.

8. A lawn-edge trimmer as defined in claim 3 wherein said mounting member comprises a substantially vertical web in an axial plane of said stem, said cam being disposed in an aperture of said web and being provided with a pair of wings straddling an edge of said aperture.

9. A lawn-edge trimmer as defined in claim 8 wherein said biasing spring is located in said aperture.

10. A lawn-edge trimmer as defined in claim 1 wherein said mounting member forms a socket for a lower end of said stem, said element passing downwardly through said socket.

* * * * *